United States Patent
Choi et al.

(10) Patent No.: US 9,982,104 B2
(45) Date of Patent: May 29, 2018

(54) REVERSE ELECTRODIALYSIS DEVICE HAVING ENHANCED MAXIMUM POWER DENSITY WITH ULTRA-THIN ION EXCHANGE MEMBRANES

(71) Applicant: KOREA INSTITUTE OF ENERGY RESEARCH, Daejeon (KR)

(72) Inventors: Young-Woo Choi, Cheongju-si (KR); Misoon Lee, Jeollabuk-do (KR); Young-Gi Yoon, Daejeon (KR); Chan-Soo Kim, Jeju-do (KR); Namjo Jeong, Jeju-do (KR); Han-Ki Kim, Jeju-do (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 83 days.

(21) Appl. No.: 15/074,655

(22) Filed: Mar. 18, 2016

(65) Prior Publication Data
US 2017/0136413 A1 May 18, 2017

(30) Foreign Application Priority Data
Nov. 16, 2015 (KR) .............................. 2015-0160460

(51) Int. Cl.
| | |
|---|---|
| *B01D 61/44* | (2006.01) |
| *C08J 5/22* | (2006.01) |
| *H01M 8/1023* | (2016.01) |
| *H01M 8/1062* | (2016.01) |
| *H01M 8/1072* | (2016.01) |
| *H01M 8/22* | (2006.01) |

(52) U.S. Cl.
CPC ............. *C08J 5/22* (2013.01); *H01M 8/1023* (2013.01); *H01M 8/1062* (2013.01); *H01M 8/1072* (2013.01); *H01M 8/227* (2013.01); *H01M 2300/0082* (2013.01); *Y02P 70/56* (2015.11)

(58) Field of Classification Search
None
See application file for complete search history.

(56) References Cited

U.S. PATENT DOCUMENTS

2015/0311558 A1* 10/2015 Van Baak ............. H01M 8/227
429/417

FOREIGN PATENT DOCUMENTS

| KR | 10-1394081 B | 5/2014 |
| KR | 10-1573468 B | 11/2015 |

* cited by examiner

*Primary Examiner* — Arun S Phasge
(74) *Attorney, Agent, or Firm* — Dentons US LLP

(57) ABSTRACT

A reverse electrodialysis device, including an anode, a cathode, one or more single cells spaced apart from each other between the anode and the cathode, each single cell including a cation exchange membrane and an anion exchange membrane, and a shielding membrane disposed to define spaces between the anode and the single cell and/or between the cathode and the single cell. The cation exchange membrane and the shielding membrane include a porous polymer substrate and a polymer electrolyte incorporated into pores in the substrate.

8 Claims, 2 Drawing Sheets

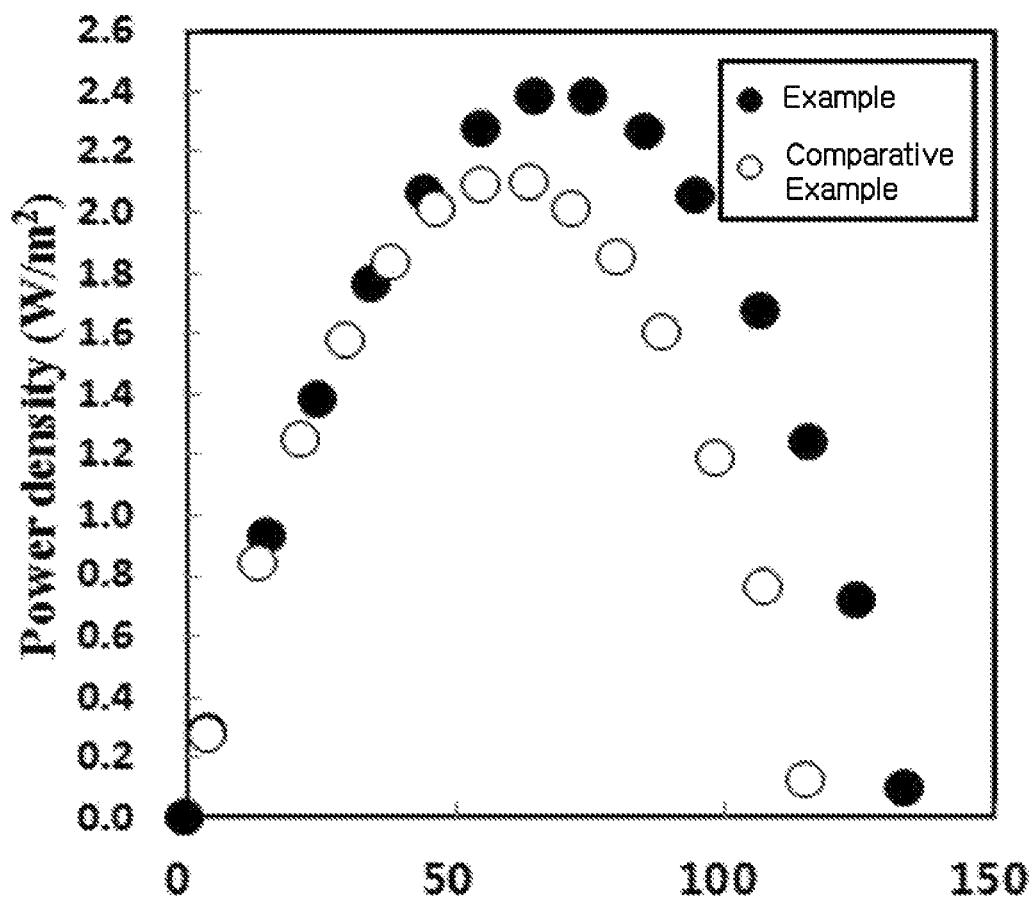

REVERSE ELECTRODIALYSIS DEVICE HAVING ENHANCED MAXIMUM POWER DENSITY WITH ULTRA-THIN ION EXCHANGE MEMBRANES

CROSS-REFERENCE TO RELATED APPLICATION

This application claims priority to Korean Patent Application No. KR 2015-016460 filed on Nov. 16, 2015 and all the benefits accruing therefrom under 35 U.S.C. § 119, the contents of which are incorporated by reference in their entirety.

BACKGROUND OF THE INVENTION

1. Field of the Invention

The present invention relates to a reverse electrodialysis device and, more particularly, to a reverse electrodialysis device which includes ion exchange membranes having high ionic conductivity to thus remarkably increase the production of power compared to conventional commercially available ion exchange membranes.

2. Description of the Related Art

Due to concerns over the depletion of fossil fuels such as oil, coal, etc. and problems of global warming caused by the generation of carbon dioxide resulting from the use of fossil fuels, the development of novel energy sources able to replace such fuels is required. In regard thereto, research and development into a variety of renewable energy sources, such as solar energy, biofuel, geothermal energy, wind energy, etc. is ongoing these days all over the world, but such renewable energy sources still account for less than 10% of global energy consumption.

Furthermore, solar energy and wind energy, which are under study as promising alternative energy sources to fossil fuels, are disadvantageous in terms of their ability to stably ensure energy production because the amount of energy that is produced varies greatly depending on the surrounding climate. Hence, high interest is taken in environmentally friendly alternative energy sources that are able to stably produce energy without depletion concerns.

In this respect, power generation techniques using reverse electrodialysis (RED) are receiving attention. Reverse electrodialysis is a clean energy technique for generating power using the difference in salinity between sea water and fresh water, and is advantageous because energy is obtained via a reverse process of desalination using electrodialysis, which is contrary to the typical electrodialysis process, in which a difference in electrolyte concentration is generated by supplying electricity, and also because power may be generated regardless of climatic conditions, time, etc., unlike other renewable energy sources such as wind energy, solar energy, etc.

Despite the above advantages, however, the reverse electrodialysis system is difficult to commercialize because of the high price of ion exchange membranes contained therein.

Therefore, with the goal of commercializing the reverse electrodialysis technique, urgently required is the development of ion exchange membranes having low electrical resistance to thus remarkably increase power density, compared to conventional commercially available ion exchange membranes, so that the inner stack resistance of a reverse electrodialysis system may be minimized and the total power production may be maximized.

CITATION LIST

Patent Literature (Patent Document 0001) Korean Patent No. 10-1394081 (Registration date: May 7, 2014)
(Patent Document 0002) Korean Patent Application Publication No. 10-2014-0038892 (Laid-open date: Apr. 1, 2014)

SUMMARY OF THE INVENTION

Accordingly, the present invention has been made keeping in mind the above problems encountered in the related art, and an object of the present invention is to provide a reverse electrodialysis device including ion exchange membranes, wherein such ion exchange membranes have excellent ionic conductivity and may thus significantly increase power production when applied to a reverse electrodialysis system, compared to when using conventional commercially available ion exchange membranes, and also, such ion exchange membranes have superior water resistance and heat resistance.

In order to accomplish the above object, the present invention provides a reverse electrodialysis device, comprising: an anode; a cathode; one or more single cells spaced apart from each other between the anode and the cathode so as to form a flow path through which fresh water flows, each of the single cells including a cation exchange membrane and an anion exchange membrane spaced apart from each other so as to form a flow path through which sea water flows; and a shielding membrane disposed so as to define spaces in at least one of a location between the anode and the single cell and a location between the cathode and the single cell, wherein the cation exchange membrane and the shielding membrane include a porous polymer substrate and a polymer electrolyte incorporated into pores in the porous polymer substrate, the polymer electrolyte being formed by impregnating the porous polymer substrate with a solution including 2-acrylamido-2-methylpropanesulfonic acid, a crosslinking agent comprising (i) a bisacrylamide-based crosslinking agent or (ii) a (meth)acryloyl group- or alkenyl group-substituted triazine, and an initiator and then performing crosslinking polymerization, and the anion exchange membrane includes a porous polymer substrate and a polymer electrolyte incorporated into pores in the porous polymer substrate, the polymer electrolyte being formed by impregnating the porous polymer substrate with a solution including (vinylbenzyl)trimethylammonium chloride, a crosslinking agent and an initiator and then performing crosslinking polymerization.

Also, the porous polymer substrate, included in the cation exchange membrane, may be a porous hydrocarbon-based membrane having a pore volume of 30 to 70%, an average pore size of 0.05 to 0.1 μm, and a thickness of 10 to 55 μm.

Also, the acrylamide-based crosslinking agent may include at least one selected from the group consisting of N,N'-ethylenebisacrylamide, N,N'-methylenebisacrylamide, N,N'-methylenebismethacrylamide, and N,N'-bisacryloylpiperazine.

Also, the initiator used to form the cation exchange membrane and the shielding membrane may be a photoinitiator or a thermal initiator, and the photoinitiator may include a Doracure series or Irgacure series photoinitiator made by Ciba-Geigy, and the thermal initiator may include N,N'-azobisisobutyronitrile (AIBN) or benzoyl peroxide (BPO).

Also, the polymer electrolyte included in the cation exchange membrane and the shielding membrane may be formed by subjecting a solution comprising 2-acrylamido-2-methylpropanesulfonic acid and a crosslinking agent at a weight ratio of 2~9:1 to crosslinking polymerization.

Also, the bisacrylamide-based crosslinking agent may include at least one selected from the group consisting of N,N'-ethylenebisacrylamide, N,N'-methylenebisacrylamide, N,N'-methylenebismethacrylamide, and N,N'-bisacryloylpiperazine.

Also, the (meth)acryloyl group-substituted triazine may be 1,3,5-triacryloylhexahydro-1,3,5-triazine.

Also, the initiator used to form the anion exchange membrane may include a Doracure series initiator made by Ciba-Geigy, an Irgacure series initiator made by Ciba-Geigy, or 2-hydroxy-2-methy-1-phenylpropan-1-one.

Also, the polymer electrolyte included in the anion exchange membrane may be formed by subjecting a solution comprising (vinylbenzyl)trimethylammonium chloride and a crosslinking agent at a weight ratio of 4~12:1 to crosslinking polymerization.

According to the present invention, cation and anion exchange membranes for a reverse electrodialysis device have excellent ionic conductivity to thus minimize membrane resistance of the ion exchange membranes, thereby significantly increasing the maximum power density of the reverse electrodialysis device, and moreover have superior water resistance and heat resistance, thereby enabling the stable operation of the reverse electrodialysis device.

BRIEF DESCRIPTION OF THE DRAWINGS

The above and other objects, features and advantages of the present invention will be more clearly understood from the following detailed description taken in conjunction with the accompanying drawings, in which:

FIG. 2 is a graph illustrating the results of measurement of power density in the reverse electrodialysis cells of Example and Comparative Example according to an embodiment of the invention.

DESCRIPTION OF PRESENTLY PREFERRED EMBODIMENTS

Figure 1:
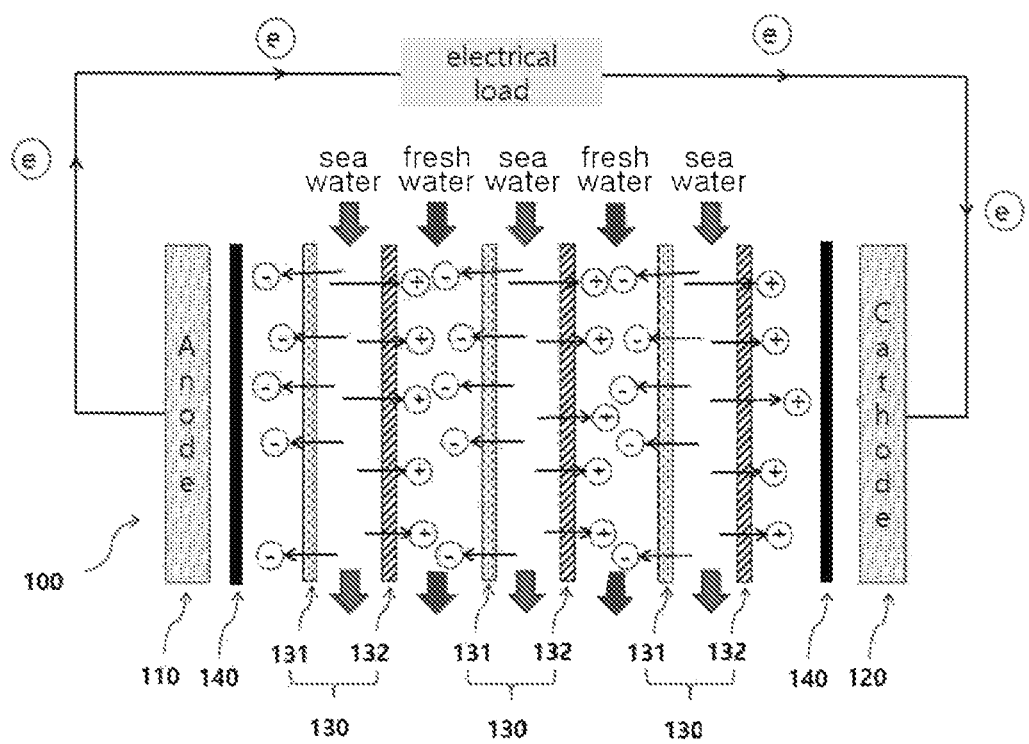
FIG. 1 is a schematic cross-sectional view illustrating a reverse electrodialysis device according to an embodiment of the present invention.

In the following description of the present invention, detailed descriptions of known functions and elements incorporated herein will be omitted when they may make the subject matter of the present invention unclear.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, a detailed description will be given of the present invention.

FIG. 1 schematically illustrates a reverse electrodialysis device according to the present invention. As illustrated in FIG. 1, the reverse electrodialysis device 100 according to the present invention comprises: an anode 110; a cathode 120; one or more single cells 130 spaced apart from each other between the anode and the cathode so as to form a flow path through which fresh water flows, each of the single cells including a cation exchange membrane 132 and an anion exchange membrane 131 spaced apart from each other so as to form a flow path through which sea water flows; and a shielding membrane 140 disposed so as to define spaces in at least one of a location between the anode and the single cell and a location between the cathode and the single cell.

The cation exchange membrane 132 and the shielding membrane 140 include a porous polymer substrate and a polymer electrolyte incorporated into the pores in the porous polymer substrate.

For reference, the shielding membrane functions to prevent the crossover of redox couples and the back-diffusion of water toward the electrodes.

As the porous polymer substrate, preferably used is a porous hydrocarbon-based membrane having a pore volume of 30 to 70%, an average pore size of 0.05 to 0.1 μm, and a thickness of 10 to 55 μm, and specific examples of the material therefor may include polyethylene, polypropylene, polyimide, polyamideimide, polypropylene oxide, polyether sulfone, and polyurethane.

Meanwhile, the polymer electrolyte is incorporated into the pores in the porous polymer substrate, and the polymer electrolyte may be formed within the pores in the porous polymer substrate by impregnating the porous polymer substrate with a solution including a monomer and the like and then performing crosslinking polymerization through thermal crosslinking or photo-crosslinking.

Preferably, the polymer electrolyte is formed by impregnating the porous polymer substrate with a solution including 2-acrylamido-2-methylpropanesulfonic acid, a crosslinking agent, comprising (i) a bisacrylamide-based crosslinking agent or (ii) a (meth)acryloyl group- or alkenyl group-substituted triazine, and an initiator, and then performing crosslinking polymerization.

More particularly, the method of manufacturing the cation exchange membrane and the shielding membrane for use in the reverse electrodialysis device according to the present invention may comprise: (a) impregnating a porous polymer substrate with a solution including a 2-acrylamido-2-methylpropanesulfonic acid monomer as a sulfonic acid-containing monomer, an acrylamide-based crosslinking agent and an initiator, and (b) applying heat or light to the porous polymer substrate impregnated with the solution in (a), thus forming a polymer electrolyte through crosslinking polymerization in the porous polymer substrate.

In the method of manufacturing the cation exchange membrane and the shielding membrane for use in the reverse electrodialysis device according to the present invention, (a) is a step of impregnating the porous polymer substrate with the solution including the monomer and the crosslinking agent, before the crosslinking polymerization in (b). The solution is specified below.

The solution is a mixed solution comprising a 2-acrylamido-2-methylpropanesulfonic acid monomer, an acrylamide-based crosslinking agent, and an initiator. When the amount of the mixed solution comprising the monomer and the crosslinking agent is 100 parts by weight, the amount of the sulfonic acid-containing aliphatic liquid monomer is 60 to 90 parts by weight, and the amount of the acrylamide-based crosslinking agent is 10 to 40 parts by weight, based on 100 parts by weight of the mixture solution. Further, the initiator may be added in an amount of 0.1 to 0.5 parts by weight to 100 parts by weight of the mixture solution.

If the amount of the sulfonic acid-containing monomer is less than 60 parts by weight, the ion exchange capacity necessary for increasing ionic conductivity may become insufficient, and it may become difficult to prepare an electrolyte mixed solution. On the other hand, if the amount thereof exceeds 90 parts by weight, the durability of the membrane may be decreased. If the amount of the crosslinking agent is less than 10 parts by weight, the degree of crosslinking may become insufficient, and thus the durability of the membrane may be decreased. On the other hand, if the amount thereof exceeds 40 parts by weight, it may be difficult to prepare the electrolyte mixed solution and the degree of crosslinking may be too high, remarkably decreasing the conductivity of the membrane.

Furthermore, the mixed solution preferably includes 2-acrylamido-2-methylpropanesulfonic acid and the crosslinking agent at a weight ratio of 2~9:1.

The acrylamide-based crosslinking agent may include, but is not limited to, at least one selected from the group consisting of N,N'-ethylenebisacrylamide, N,N'-methylenebisacrylamide, N,N'-methylenebismethacrylamide, and N,N'-bisacryloylpiperazine. The initiator may include a photoinitiator, for example, any one of Doracure or Irgacure series photoinitiators, made by Ciba-Geigy, Switzerland, and a thermal initiator, for example, any one of N,N'-azobisisobutyronitrile (AIBN) and benzoyl peroxide (BPO).

In (a), the polymer substrate may be pretreated in a manner in which the surface and inner pores thereof are subjected to hydrophilic treatment, before being impregnated with the solution in order to increase the filling factor of the solution into the pores and to promote the crosslinking polymerization in (b).

Specific methods for hydrophilic treatment are not particularly limited, but may include sulfone hydrophilization or surfactant-aided hydrophilization.

As for sulfone hydrophilization, the porous polymer substrate is immersed in a solution obtained by mixing 98% or more sulfuric acid and 96% or more chlorosulfuric acid at a weight ratio of 1:1 to 3:1, allowed to react at 30 to 60° C. for 2 to 5 hr, and preferably at 45 to 50° C. for 3 to 4 hr, and then rinsed with 1 to 3 N sodium hydroxide solution for one day or longer, thereby completing hydrophilic pretreatment.

As for surfactant-aided hydrophilization, the porous polymer substrate is immersed in a surfactant solution so that the surface of the pores may be hydrophilized. As such, the kind of surfactant is not particularly limited, as long as the porous polymer substrate is hydrophilized. Preferably useful is a nonionic surfactant.

In the method of manufacturing the cation exchange membrane and the shielding membrane for use in the reverse electrodialysis device according to the present invention, (b) is a step of applying heat or light to the porous polymer substrate impregnated with the solution in (a) to perform thermal crosslinking or photo-crosslinking, thus forming a polymer electrolyte through crosslinking polymerization in the porous polymer substrate. In consideration of the composition of the solution, the degree of crosslinking, and the thermal stability of the substrate as described above, thermal crosslinking or photo-crosslinking may be carried out under appropriate crosslinking conditions (temperature for thermal polymerization, light irradiation energy for photo-crosslinking, atmosphere for crosslinking polymerization, etc.).

The present step may be performed in a state in which polymer films such as polyethylene terephthalate (PET) films are formed on both sides of the porous polymer substrate impregnated with the solution. In this case, the polymer films may be stripped from the porous polymer substrate, after completion of the present step.

Next, the anion exchange membrane 131 contained in the reverse electrodialysis device according to the present invention is specified below.

The anion exchange membrane may include a porous polymer substrate and a polymer electrolyte incorporated into the pores in the porous polymer substrate.

As the porous polymer substrate, a porous hydrocarbon-based membrane having a pore volume of 30 to 70%, an average pore size of 0.05 to 0.1 μm, and a thickness of 10 to 55 μm may be used, and specific examples for the material thereof may include polyethylene, polypropylene, polyimide, polyamideimide, polypropylene oxide, polyether sulfone, and polyurethane.

The polymer electrolyte is incorporated into the pores in the porous polymer substrate, and the polymer electrolyte may be formed within the pores in the porous polymer substrate by impregnating the porous polymer substrate with a solution including a monomer and the like and then performing crosslinking polymerization through thermal crosslinking or photo-crosslinking.

Preferably, the anion exchange membrane includes a porous polymer substrate and a polymer electrolyte incorporated into the pores in the porous polymer substrate, and the polymer electrolyte may be formed by impregnating the porous polymer substrate with a solution including (vinylbenzyl)trimethylammonium chloride, a crosslinking agent and an initiator and then performing crosslinking polymerization.

More specifically, the method of manufacturing the anion exchange membrane for use in the reverse electrodialysis device according to the present invention may comprise: (a) impregnating a porous polymer substrate with a solution including a (vinylbenzyl)trimethylammonium chloride monomer as an electrolyte monomer of a cationic tetravalent ammonium salt, a crosslinking agent and an initiator and (b) applying heat or light to the porous polymer substrate impregnated with the solution in (a), thus forming a polymer electrolyte through crosslinking polymerization in the porous polymer substrate.

Here, (a) is a step of impregnating the porous polymer substrate with the solution including a (vinylbenzyl)trimethylammonium chloride monomer, a crosslinking agent and an initiator, before the crosslinking polymerization in (b).

The crosslinking agent may include a bisacrylamide-based crosslinking agent or a (meth)acryloyl group- or alkenyl group-substituted triazine. When the bisacrylamide-based crosslinking agent is used, at least one selected from the group consisting of N,N'-ethylenebisacrylamide, N,N'-methylenebisacrylamide, N,N'-methylenebismethacrylamide, and N,N'-bisacryloylpiperazine is useful, but the present invention is not limited thereto. The (meth)acryloyl group-substituted triazine may be exemplified by 1,3,5-triacryloylhexahydro-1,3,5-triazine, etc.

The initiator may include a photoinitiator, for example, a Doracure or Irgacure series photoinitiator, made by Ciba-Geigy, but the present invention is not limited thereto.

The solvent used to form the solution may include known solvents in the art, and examples thereof may include water and mixed solvents comprising water and a polar solvent (dimethylformamide, dimethylacetamide, nitromethylpyrrolidone, dimethylsulfoxide, dimethylfluoride and the like).

Also, the solution may be configured such that 100 parts by weight of a solution comprising 60 to 75 parts by weight of (vinylbenzyl)trimethylammonium chloride, 5 to 16 parts by weight of a (meth)acryloyl group-substituted triazine and 20 to 25 parts by weight of a solvent, containing no initiator, is mixed with 0.5 to 2 parts by weight of an initiator.

Furthermore, the solution preferably includes (vinylbenzyl)trimethylammonium chloride and a crosslinking agent at a weight ratio of 4~12:1.

In (a), the polymer substrate may be pretreated in a manner in which the surface and inner pores thereof are subjected to hydrophilic treatment, before being impregnated with the solution in order to increase the filling factor of the solution into the pores and to promote the crosslinking polymerization in (b).

Specific methods for hydrophilic treatment are not particularly limited, but may include sulfone hydrophilization, etc.

As for sulfone hydrophilization, the porous polymer substrate is immersed in a solution obtained by mixing 98% or more sulfuric acid and 96% or more chlorosulfuric acid at a weight ratio of 1:1 to 3:1, allowed to react at 30 to 60° C. for 2 to 5 hr, and preferably at 45 to 50° C. for 3 to 4 hr, and then rinsed with 1 to 3 N sodium hydroxide solution for one day or longer, thereby completing hydrophilic pretreatment.

In the method of manufacturing the anion exchange membrane for use in the reverse electrodialysis device according to the present invention, (b) is a step of applying heat or light to the porous polymer substrate impregnated with the solution in (a) to perform thermal crosslinking or photo-crosslinking, thus forming a polymer electrolyte through crosslinking polymerization in the porous polymer substrate. Taking into consideration the composition of the solution, the degree of crosslinking, and the thermal stability of the substrate as described above, thermal crosslinking or photo-crosslinking may be carried out under appropriate crosslinking conditions (temperature for thermal polymerization, light irradiation energy for photo-crosslinking, atmosphere for crosslinking polymerization, etc.).

The present step may be performed in a state in which polymer films such as polyethylene terephthalate (PET) films are formed on both sides of the porous polymer substrate impregnated with the solution. In this case, the polymer films may be stripped from the porous polymer substrate, after completion of the present step.

Briefly describing the principle of operation of the reverse electrodialysis device according to the present invention, when fresh water and sea water are alternately allowed to flow through the flow paths formed between the ion exchange membranes, which are configured such that cation exchange membranes and anion exchange membranes are alternately disposed with predetermined gaps therebetween, cations and anions in the sea water are transferred toward the fresh water through the cation exchange membranes and the anion exchange membranes, respectively, due to the concentration difference between the fresh water and the sea water, whereby a potential difference is created between the electrodes at both ends of the reverse electrodialysis device, thus producing electrical energy through redox reaction at the electrodes.

The reverse electrodialysis device according to the present invention may further include, in addition to the above elements, a spacer for forming the flow path (for the flow of electrode rinsing solution) between the anode (or the cathode) and the ion exchange membrane adjacent thereto, for forming the flow path (for the flow of fresh water) between the single cells, or for forming the flow path (for the flow of sea water) between the cation exchange membrane and the anion exchange membrane of the single cell. As such, the spacer is preferably made of a material having ion permeability and electrical insulating properties.

A better understanding of the present invention may be obtained through the following examples, which may be modified in various ways and are not to be construed as limiting the scope of the present invention. The examples of the present application are provided to more fully describe the technical spirit of the present invention to those skilled in the art.

<Example> Manufacture of Reverse Electrodialysis Cell (1) Manufacture of Cation Exchange Membrane for Reverse Electrodialysis Device 2-acrylamido-2-methylpropanesulfonic acid and N,N'-ethylenebisacrylamide were mixed at a weight ratio of 2:1 and stirred, and 100 parts by weight of the mixed solution thus obtained was further mixed with 1 part by weight of a Darocur1173 initiator diluted at 10 parts by weight in methanol.

Subsequently, the resulting solution was incorporated into a microporous polyolefin substrate having a thickness of 22 µm, an average pore size of 0.07 µm and a pore volume of 45%, obtained by performing hydrophilic treatment on the surface of the pores thereof through drying after immersion for 2 min in a solution of a commercially available surfactant, dodecylbenzenesulfonic acid (DBSA), diluted at 1 part by weight in water, whereby the monomer solution was sufficiently smeared into the support, after which the support was interposed between PET films and irradiated with UV energy at 150 mJ/cm$^2$.

After the crosslinking process, the PET films were stripped, and byproducts were removed from the surface of the composite membrane, whereby the surface was made uniform, followed by washing with ultrapure water several times, finally manufacturing a cation exchange membrane for a reverse electrodialysis device.

(2) Manufacture of Anion Exchange Membrane for Reverse Electrodialysis Device (Vinylbenzyl)trimethylammonium chloride and N,N'-bisacryloylpiperazine were mixed at a weight ratio of 12:1 and stirred, and 100 parts by weight of the mixed solution thus obtained was further mixed with 1 part by weight of a Darocur1173 initiator diluted at 10 parts by weight in methanol.

Subsequently, the resulting solution was incorporated into a microporous polyolefin substrate having a thickness of 22 μm, an average pore size of 0.07 μm and a pore volume of 45%, obtained by performing hydrophilic treatment on the surface of the pores thereof through drying after immersion for 2 min in a solution of a commercially available surfactant, DBSA, diluted at 1 part by weight in water, whereby the monomer solution was sufficiently smeared into the support, after which the support was interposed between PET films and irradiated with UV energy at 150 mJ/cm$^2$.

After the crosslinking process, the PET films were stripped, and byproducts were removed from the surface of the composite membrane, whereby the surface was made uniform, followed by washing with deionized water several times, finally manufacturing an anion exchange membrane for a reverse electrodialysis device.

(3) Manufacture of Shielding Membrane for Reverse Electrodialysis Device 2-acrylamido-2-methylpropanesulfonic acid and N,N'-ethylenebisacrylamide were mixed at a weight ratio of 2:1 and stirred, and 100 parts by weight of the mixed solution thus obtained was further mixed with 1 part by weight of a Darocur1173 initiator diluted at 10 parts by weight in methanol.

Subsequently, the resulting solution was incorporated into a microporous polyolefin substrate, having a thickness of 22 μm, an average pore size of 0.07 μm and a pore volume of 45%, obtained by performing hydrophilic treatment on the surface of the pores thereof through drying after immersion for 2 min in a solution of a commercially available surfactant, DBSA, diluted at 1 part by weight in water, whereby the monomer solution was sufficiently smeared into the support, after which the support was interposed between PET films and irradiated with UV energy at 150 mJ/cm$^2$.

After the crosslinking process, the PET films were stripped, and byproducts were removed from the surface of the composite membrane, whereby the surface was made uniform, followed by washing with ultrapure water several times, finally manufacturing a shielding membrane for a reverse electrodialysis device.

(4) Manufacture of Reverse Electrodialysis Cell Including Ion Exchange Membranes Manufactured in (1) to (3)

Between an anode and a cathode (10 cm×10 cm, effective area: 0.0071 m$^2$) obtained by polishing graphite electrodes, the anion exchange membrane manufactured in (2) and the cation exchange membrane manufactured in (1) were spaced apart from each other by the spacer, and the shielding membrane manufactured in (3) was provided adjacent to the electrodes. Further, a carbon-type electrode spacer (thickness: 0.1 mm) was provided to ensure the flow path for the flow of the electrode rinsing solution (50 mM Fe(CN)$_6^{3-/4-}$ aqueous solution and 0.5 M Na$_2$SO$_4$ aqueous solution), and a PTFE gasket (thickness 0.1 mm) was also provided, yielding a reverse electrodialysis (RED) cell.

<Comparative Example> Manufacture of Reverse Electrodialysis Cell

A reverse electrodialysis cell was manufactured in the same manner as in the above example, with the exception that a cation exchange membrane, obtained by mixing a vinyl sulfonic acid monomer and N,N'-ethylenebisacrylamide at a molar ratio of 8.83:1 and then performing crosslinking polymerization, was used.

<Test Example> Measurement of Maximum Power Density of Reverse Electrodialysis Cells of Example and Comparative Example For each of the reverse electrodialysis cells of Example and Comparative Example, the electrode rinsing solution was subjected to closed cycling of the anode and the cathode at a flow rate of 80 mL/min using a peristaltic pump, and saline, which was made to simulate sea water of 3.0% (W/W, 0.5M, 45 to 50 mS/cm) using sodium chloride (99%), was fed to the cell at a flow rate of 50 mL/min, and tap water (150 to 200 uS/cm), corresponding to fresh water, was fed to the cell at a flow rate of 30 mL/min, and the power of the cell was measured. The results are shown in the power density graph of FIG. 2.

As illustrated in FIG. 2, the reverse electrodialysis cell manufactured in the example of the invention exhibited a notably high power density of a maximum of about 2.4 W/m$^2$ per unit area of the ion exchange membrane.

Based on the above results, the reverse electrodialysis device according to the present invention includes ion exchange membranes having excellent ionic conductivity and minimum membrane resistance, thereby significantly increasing maximum power density.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reverse electrodialysis device, comprising:
   an anode;
   a cathode;
   one or more single cells spaced apart from each other between the anode and the cathode so as to form a flow path through which fresh water flows, each of the single cells including a cation exchange membrane and an anion exchange membrane spaced apart from each other so as to form a flow path through which sea water flows; and
   a shielding membrane disposed so as to define spaces in at least one of a location between the anode and the single cell or a location between the cathode and the single cell,
   wherein,
   each of the cation exchange membrane and the shielding membrane includes a porous polymer substrate having a pore volume of 30 to 70%, an average pore size of 0.05 μm to 0.1 μm, and a polymer electrolyte impregnating pores in the porous polymer substrate, the pores having inner surfaces which are hydrophilic, the polymer electrolyte being a crosslinked polymer made of (a) a solution including 2-acrylamido-2-methylpropanesulfonic acid, (b) a crosslinking agent comprising (i) a bisacrylamide-based crosslinking agent or (ii) a (meth)acryloyl group- or alkenyl group-substituted triazine, and (c) an initiator, and
   the anion exchange membrane includes a porous polymer substrate having a pore volume of 30% to 70%, an average pore size of 0.05 μm to 0.1 μm, and a polymer electrolyte impregnating pores in the porous polymer substrate, the pores having inner surfaces which are hydrophilic, the polymer electrolyte being a crosslinked polymer made of a solution including (vinylbenzyl)trimethylammonium chloride, a crosslinking agent, and an initiator.

2. The reverse electrodialysis device of claim 1, wherein the porous polymer substrate, included in the cation exchange membrane, is a porous hydrocarbon-based membrane with a thickness of 10 µm to 55 µm.

3. The reverse electrodialysis device of claim 1, wherein the acrylamide-based crosslinking agent comprises at least one selected from the group consisting of N,N'-ethylenebisacrylamide, N,N'-methylenebisacrylamide, N,N'-methylenebismethacrylamide, and N,N'-bisacryloylpiperazine.

4. The reverse electrodialysis device of claim 1, wherein the initiator used to form the cation exchange membrane and the shielding membrane is a photoinitiator or a thermal initiator, and the photoinitiator comprises a Doracure series or Irgacure series photoinitiator made by Ciba-Geigy, and the thermal initiator comprises N,N'-azobisisobutyronitrile (AIBN) or benzoyl peroxide (BPO).

5. The reverse electrodialysis device of claim 1, wherein the polymer electrolyte included in the cation exchange membrane and the shielding membrane is formed by subjecting a solution comprising 2-acrylamido-2-methylpropanesulfonic acid and a crosslinking agent at a weight ratio of 2~9:1 to crosslinking polymerization.

6. The reverse electrodialysis device of claim 1, wherein the bisacrylamide-based crosslinking agent comprises at least one selected from the group consisting of N,N'-ethylenebisacrylamide, N,N'-methylenebisacrylamide, N,N'-methylenebismethacrylamide, and N,N'-bisacryloylpiperazine.

7. The reverse electrodialysis device of claim 1, wherein the (meth)acryloyl group-substituted triazine is 1,3,5-triacryloylhexahydro-1,3,5-triazine.

8. The reverse electrodialysis device of claim 1, wherein the polymer electrolyte included in the anion exchange membrane is formed by subjecting a solution comprising (vinylbenzyl)trimethylammonium chloride and a crosslinking agent at a weight ratio of 4~12:1 to crosslinking polymerization.

* * * * *